No. 729,124. PATENTED MAY 26, 1903.
W. C. BOONE.
EXPANSION BOLT.
APPLICATION FILED FEB. 27, 1903.
NO MODEL.

Witnesses
C. W. Benjamin
Henry T. Bright

W. C. Boone,
Inventor
By his Attorney F. F. Bourne

THE NORRIS PETERS CO., PHOTO-LITHO., WASHINGTON, D. C.

No. 729,124. Patented May 26, 1903.

UNITED STATES PATENT OFFICE.

WILLIAM C. BOONE, OF NEW YORK, N. Y.

EXPANSION-BOLT.

SPECIFICATION forming part of Letters Patent No. 729,124, dated May 26, 1903.

Application filed February 27, 1903. Serial No. 145,344. (No model.)

*To all whom it may concern:*

Be it known that I, WILLIAM C. BOONE, a citizen of the United States, and a resident of New York city, borough of Richmond, State of New York, have invented certain new and useful Improvements in Expansion-Bolts, of which the following is a specification.

My invention has relation to improvements in expansion-bolts of the class shown in Letters Patent No. 719,426, issued to me February 3, 1903, and has for its object to improve the construction of such bolts to the end that the same may be simpler in construction and produced at less cost; and to such and other ends my invention contemplates the novel details of improvement that will be more fully hereinafter set forth and then pointed out in the claims.

Reference is to be had to the accompanying drawings, forming part hereof, wherein—

Figure 1:
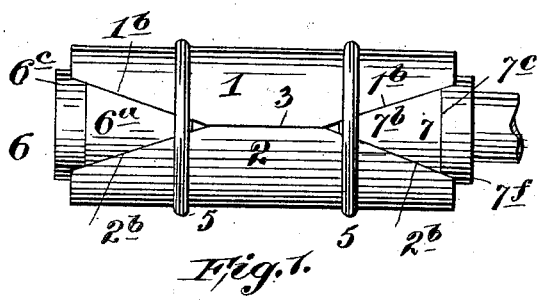
Figure 8:
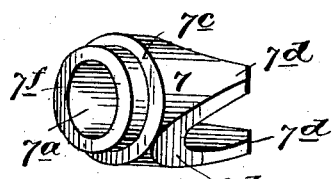
Figure 2:
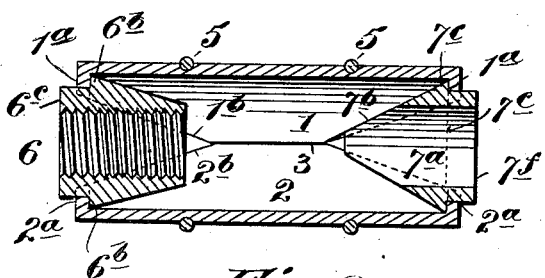
Figure 10:
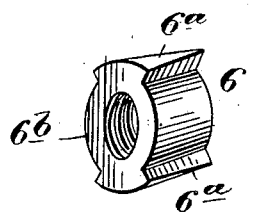
Figure 3:
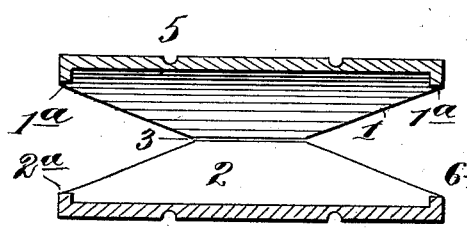
Figure 9:
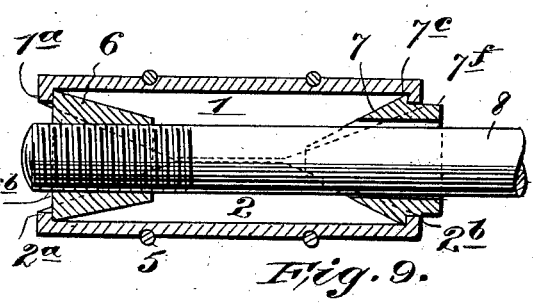
Figure 4:
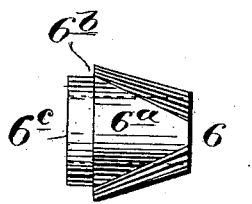
Figure 5:
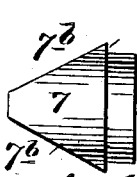
Figure 11:
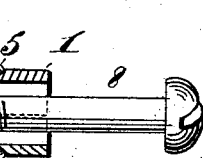
Figure 6:
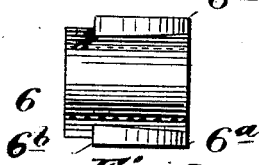
Figure 7:
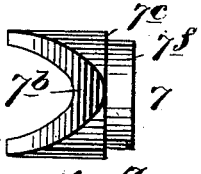

Figure 1 is a side view of an expansion-bolt embodying my invention. Fig. 2 is a central section thereof. Fig. 3 is a similar view, the nut and collar being removed. Figs. 4 and 5 are detail views of the nut and collar shown in Fig. 2. Figs. 6 and 7 are respectively views at right angles to Figs. 4 and 5. Fig. 8 is a perspective view, enlarged, of the collar shown in said views. Fig. 9 is a sectional view of the expansion-bolt, showing the nut without the hub $6^c$. Fig. 10 is a perspective view of said nut, and Fig. 11 is a sectional view of a single expansion-bolt having a nut similar to that shown in Fig. 10.

Similar numerals of reference indicate corresponding parts in the several views.

In the drawings the numerals 1 2 indicate the covers or expansion members of the expansion-bolt, which are curved or of concavo-convex form and of substantially tube form when placed together to meet centrally, as at 3, and at their ends said covers are provided, respectively, with inwardly-projecting shoulders or lugs $1^a$ $2^a$. The edges of the covers are beveled or tapered outwardly at $1^b$ $2^b$, at one or both ends, to points coinciding with the curved ends of the covers at which the shoulders $1^a$ $2^a$ are located. Spring or elastic bands 5 surround the covers to normally hold them together. When the covers are held together outwardly, tapered openings or jaws are provided between the edges $1^b$ $2^b$, within which the expansion-nut 6 and collar 7 are adapted to fit, the collar being used with the double expansion-bolt and omitted in a single expansion-bolt, as in Fig. 11. The nut 6, provided with internal screw-threads, receives the threads on a bolt, screw, or the like 8, and is provided on opposite sides with wedge-shaped projections or wings $6^a$ adapted to fit between the tapering edges $1^b$ $2^b$ of the covers 1 2 to act in spreading said covers apart when the nut is moved inwardly, the part $6^b$ of the nut 6, the end adjacent the large ends of the projections $6^a$ and between said projections, is in the form of shoulders adapted to fit within the covers 1 2, to lie against the projections or shoulders $1^a$ $2^a$, to keep the nut from sliding backwardly out from between the covers. The nut shown in Figs. 1, 2, 4, and 6 is provided with a hub $6^c$, extending outwardly beyond the part $6^b$, and thus beyond the normal position of the hub with respect to the covers. (See Figs. 1 and 2.) In Figs. 9 and 11 the nut is not provided with the hub $6^c$, but has the shoulders $6^b$, as in Fig. 10, and the nut lies wholly within the covers, and the bolt 8 serves to draw the nut within the covers.

The collar 7 is provided with a bore $7^a$ for the free passage of the bolt or screw 8, and said collar is wedge-shaped or tapered inwardly on opposite sides of its bore at $7^b$, the beveled or tapering edges being adapted to lie between the tapering edges $1^b$ $2^b$ of the covers 1 2, to spread said covers apart when pushed inwardly, and said collar is provided with a shoulder or annular rim $7^c$, adjacent to the outer edges of the beveled portions $7^b$, which shoulder is adapted to slide within the covers, and over which shoulder the projections $1^a$ $2^a$ are adapted to fit, as shown in Fig. 2, to keep the collar from sliding away from the covers. It will be seen in Fig. 8 that the collar so constructed has two inwardly-tapering jaws $7^d$, providing a bore between them through which the bolt 8 passes. The collar 7 is provided with a hub $7^f$, projecting outwardly beyond the shoulder or annular rim $7^c$, but of less diameter than said shoulder or rim, adapted to have the part to be clamped pressed against its outer end, whereby when the bolt or screw 8 is set up pressure will be brought to bear upon said hub to push the beveled or tapered faces 7ᵇ of the collar between the tapering edges of the cover and expand the latter.

In Figs. 1 and 2 the double expansion-bolt shown is provided with a nut 6, having the hub 6ᶜ, and a collar 7, having the hub 7ᶠ, whereby when the pressure is brought to bear on either or both of said hubs the covers 1 2 will be expanded by the inward sliding of the nut or collar, or both, so that a temporary expansion can be effected until the final expansion takes place through the medium of the bolt 8.

In Fig. 9 the nut 6, not having the hub 6ᶜ, is shown, and in such case when the expansion-bolt is placed in a hole the collar 7 can be pushed inwardly by the hub 7ᶠ to make a temporary expansion, and thus when the bolt is screwed up the nut 6 and collar 7 will together expand the covers.

In the single expansion-bolt shown in Fig. 11 the nut 6 is maintained within the covers by the parts 6ᵇ of the nut and 1ᵃ 2ᵃ of the covers, and when the bolt or screw 8 is set up the nut will be drawn inwardly to expand the covers.

Having now described my invention, what I claim is—

1. An expansion-bolt comprising covers having inwardly-projecting shoulders at the ends, and provided with inclined edges projecting toward the ends, a nut provided with wedge-shaped projections or wings on opposite sides and having shoulders at the end adjacent the large ends of said projections to engage the shoulders on the covers, and a bolt to coact with said nut, substantially as described.

2. An expansion-bolt comprising covers having inwardly-projecting shoulders at the ends, and provided with inclined edges projecting toward the ends, a nut provided with wedge-shaped projections or wings on opposite sides and having shoulders at the end adjacent the large ends of said projections to engage the shoulders on the covers and a bolt to coact with said nut, said nut having a hub extending outwardly beyond its projections, substantially as described.

3. An expansion-bolt comprising covers having inwardly-projecting shoulders at the ends, and provided with inclined edges projecting toward the ends, a nut provided with wedge-shaped projections or wings on opposite sides and having shoulders at the end adjacent the large ends of said projections to engage the shoulders on the covers, a bolt to coact with said nut, and a collar having wedge-shaped sides and provided with a shoulder or rim adjacent to the tapering edges thereof to engage the shoulders on the covers, substantially as described.

4. An expansion-bolt comprising covers having inwardly-projecting shoulders at the ends, and provided with inclined edges projecting toward the ends, a nut provided with wedge-shaped projections or wings on opposite sides and having shoulders at the end adjacent the large ends of said projections to engage the shoulders on the covers, a bolt to coact with said nut, and a collar having wedge-shaped sides and provided with a shoulder or rim adjacent to the tapering edges thereof to engage the shoulders on the covers said collar having a hub extending outwardly from said shoulder, substantially as described.

5. An expansion-bolt comprising covers having inwardly-projecting shoulders at the ends and provided with inclined edges projecting toward the ends, a nut provided with wedge-shaped projections or wings on opposite sides and having shoulders at the end adjacent the large ends of said projections to engage the shoulders on the covers, a bolt to coact with said nut, and a collar having a pair of wedge-shaped portions on opposite sides of its bore, a shoulder or annular rim adjacent to the outer edges of the beveled or inclined faces at the sides of the wedge-shaped portions, and a hub extending outwardly from said shoulder or annular rim, substantially as described.

6. A nut for an expansion-bolt comprising a body having wedge-shaped projections or wings on opposite sides and shoulders at the end of the body between the large ends of said projections or wings, substantially as described.

7. A collar for an expansion-bolt comprising a body having a bore and tapering jaws on opposite sides of the bore at one end, a shoulder or rim at the end opposite the jaws, substantially as described.

8. A collar for an expansion-bolt comprising a body having a bore and tapering jaws on opposite sides of the bore at one end, a shoulder or rim at the end opposite the jaws, and a hub projecting from the end opposite the jaws, substantially as described.

WILLIAM C. BOONE.

Witnesses:
FRANK FOGGIN,
ELISHA J. FIELD.